2,904,595

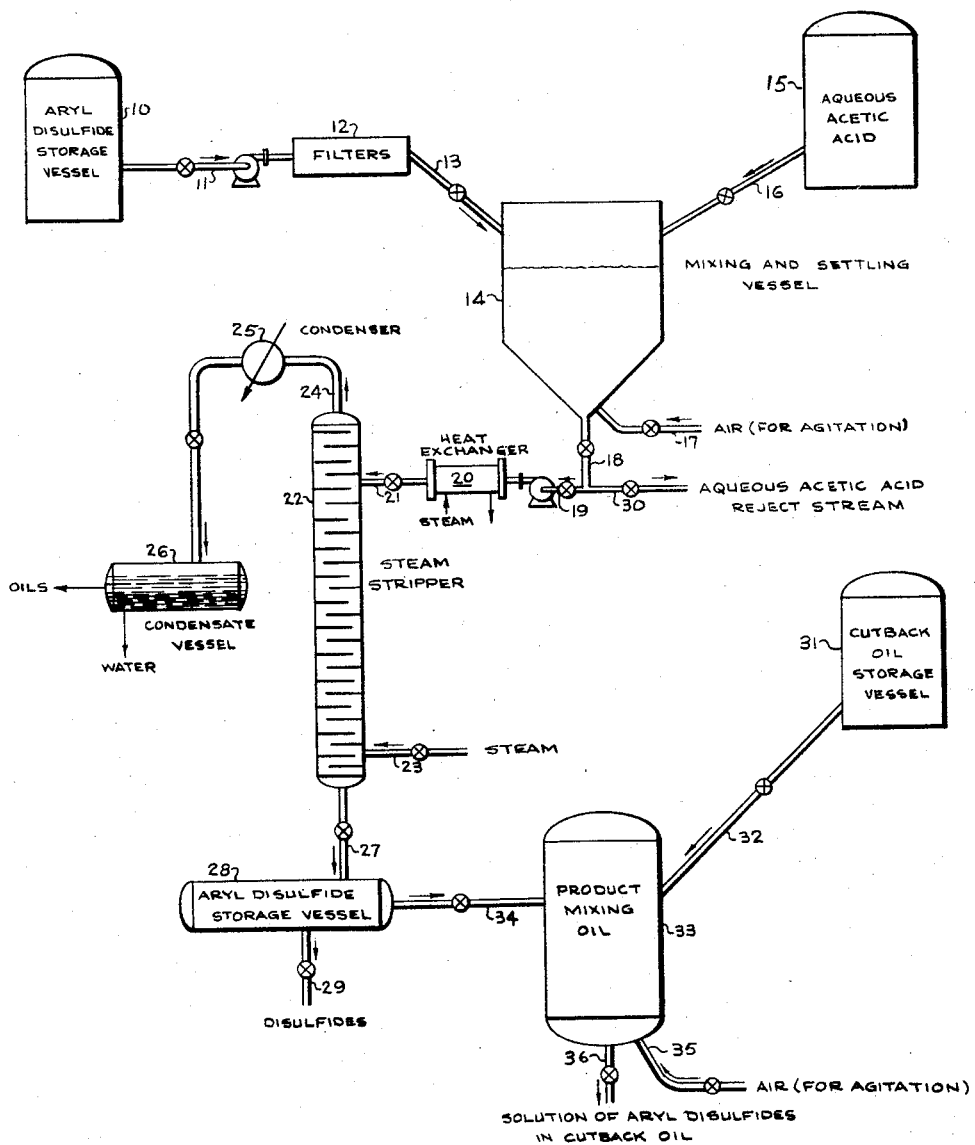

PURIFICATION OF ARYL DISULFIDES

Martin B. Neuworth, Pittsburgh, Pa., John C. Paterson, New City, N.Y., and Richard P. Tarbox, Westfield, N.J., assignors to Consolidation Coal Company, Pittsburgh, Pa., a corporation of Pennsylvania Application May 8, 1957, Serial No. 657,768

8 Claims. (Cl. 260—608)

The present invention relates to the removal of impurities from aryl disulfides. More particularly, the invention relates to an aqueous acetic acid washing treatment to remove inorganic contaminants from aryl disulfides.

Aryl disulfides are those chemical compounds having the following structural formula:

$$R\text{—}S\text{—}S\text{—}R'$$

wherein R and R' represent a phenyl, a tolyl or a xylyl radical. Such compounds are readily formed by oxidation of mixtures of thiophenol, thiocresols, and thioxylenols. One commercial source of aryl disulfides is a waste stream from petroleum refineries. In catalytic cracking processes employed in modern petroleum refineries, the catalyzate contains substantial quantities of acidic materials which include principally phenol, cresols, xylenols, thiophenol, thiocresols, and thioxylenols. These acidic materials are removed from the refinery catalyzate by a caustic extraction process and are recovered in the form of an aqueous caustic cresylate. The caustic cresylate can be acidified to spring the cresylic acids from the aqueous phase and permit their separate recovery. When the cresylic acids thereafter are subjected to an oxidizing treatment, the aryl hydrosulfides (thiophenol, thiocresols and thioxylenols) tend to couple whereby aryl disulfides are formed. The phenolic ingredients of the oxidized cresylic acids can be recovered thereafter in a purified condition by an aqueous caustic wash. The aryl disulfides remain undissolved in the aqueous caustic and can be recovered by decantation.

These aryl disulfides have found utility as rubber reclaiming reagents. A solution of the aryl disulfides in a high boiling oil is effective to depolymerize vulcanized rubber to permit reuse of the rubber by revulcanization. The reclaimed rubber frequently is blended with crude rubber prior to vulcanization.

The inorganic contaminants found in crude aryl disulfides can be detected analytically as an ash remaining after combustion of a sample of the crude material. The inorganic contaminants frequently include copper which may appear as finely divided particles of metal or oxides or as salts. Copper usually is introduced into the aryl disulfides during copper sweetening processes employed in petroleum refineries. In addition, the aryl disulfides frequently contain manganese in the form of finely divided particles of metal or oxides or as salts. The manganese usually is introduced into the aryl disulfides during the oxidation treatment employed to form the disulfides from the hydrosulfides. Manganese compounds are used as a catalyst for the oxidation (U.S. Patents 1,993,287 and 2,035,121). Both copper and manganese are notorious poisons in the rubber compounding art. They tend to promote oxidation of rubber products. Accordingly, aryl disulfides which contain copper or manganese cannot be employed as rubber reclaiming reagents.

Hence it is essential that aryl disulfides be substantially free of copper and manganese to permit their use as rubber reclaiming reagents.

In addition, the aryl disulfides frequently contain quantities of low boiling organic sulfur compounds and neutral oils which are objectionable because of their foul odor. It is desirable that these low boiling sulfur compounds are neutral oils be removed from the aryl disulfides.

One obvious way to eliminate both types of contaminants is by distillation of the aryl disulfides. In fact, vacuum distillation on a laboratory scale has been eminently satisfactory for this purpose. Extensive exposure of aryl disulfides to elevated temperatures causes a reversion of the disulfides to aryl hydrosulfides which is undesirable. Their distillation, accordingly, must be carried out at short residence times under high vacuum. However, on a commercial scale the vacuum distillation technique introduces extraordinary expenses into the cost of preparing aryl disulfides satisfactory for use as a rubber reclaiming agent.

We have found, according to the present invention, that the copper and manganese can be virtually eliminated from aryl disulfides by an aqueous acetic acid washing treatment. Aqueous acetic acid is immiscible with the aryl disulfides. The copper and manganese form water-soluble metallic acetates which remain in the aqueous acetic acid phase and are thereby removed from the aryl disulfide liquid by decantation. The aryl disulfides, thus purified, can be freed of the low boiling sulfur compounds and any residual acetic acid by a simple inexpensive steam stripping treatment.

It is an object of this invention to provide a process for removing inorganic contaminants, especially objectionable copper and manganese from liquid aryl disulfides by an aqueous acetic acid washing treatment. A further object of this invention is to remove low boiling sulfur compounds, neutral oils and residual acetic acid from aryl disulfides by a steam stripping treatment.

For a complete understanding of the present invention, its objects and advantages, reference should be had to the accompanying drawing which is a schematic flow diagram illustrating apparatus adapted to practice the present invention.

Referring to the drawing, a storage vessel 10 is provided as a surge vessel for the aryl disulfides with which the process is concerned. A quantity of aryl disulfides is withdrawn from the storage vessel 10 through a valved conduit 11 and pumped through mechanical filters 12 which serve to remove any mechanical impurities in the starting material. Mechanical impurities might include metallic particles, catalyst particles and pitchlike materials frequently found in aryl disulfides which have been stored for extended periods. The filtration step clarifies the aryl disulfides and produces a light colored material as filtrate. The characteristic black color of crude aryl disulfides results from a suspension of minute pitchlike particles therein. Aryl disulfides are recovered as filtrate through a valve dconduit 13 and are pumped into a mixing and settling vessel 14.

Aqueous acetic acid is provided in a storage vessel 15. Preferably the concentration of the acetic acid is from about 1 to 20 percent acetic acid in water. The aqueous acetic acid is introduced into the mixing and settling vessel 14 through a valved conduit 16. About 0.5 to 20 pounds of aqueous acetic acid are employed per 100 pounds of aryl disulfides in the mixing and settling vessel 14. In a preferred embodiment we employ for each 100 pounds of aryl disulfides about 2.5 pounds of a 5 percent aqueous solution of acetic acid. The aryl disulfides form a non-soluble organic phase and the aqueous acetic acid forms a supernatant aqueous phase. Intimate mixing of the two phases is effected within the mixing and settling vessel 14. Conveniently the mixing can be accomplished by bubbling air upwardly through the liquid phases from a conduit 17 which is provided in the base of the mixing and settling vessel 14. If desired, mechanical agitation may be provided.

The agitation is continued for a period of about 1 to 20 hours. Following the agitation period, the phases are permitted to separate. Most of the inorganic material, especially the copper and manganese, appears in the aqueous acetic acid phase. The organic phase, containing the aryl disulfides, is withdrawn from the mixing and settling vessel 14 through a valved conduit 18 and is pumped through a valved conduit 19, a heat exchanger 20 and a valved conduit 21 into a steam stripper 22. Within the heat exchanger 20 the aryl disulfides are elvated in temperature to about 100° C., i.e., the boiling point of water. The stripping also assures a moisture-free product.

The steam stripper 22 may comprise any type of liquid-vapor contacting apparatus. A tray tower is schematically illustrated in the drawing. A packed tower also might be employed. From about 1 to 20 pounds of steam are introduced into the stripper 22 through a conduit 23 located near the bottom of the steam stripper 22. The live steam serves to strip out water, low boiling sulfur compounds and neutral oils from the aryl disulfides which remain in the liquid phase. Any residual acetic acid also passes into the vapor phase along with the steam. The vapor phase contaminants in steam are recovered overhead from the steam stripper 22 through a conduit 24. A condenser 25 in conduit 24 cools the vapors and condenses them to a liquid phase. The liquid phase is recovered in a condensate vessel 26 from which a water phase and an oil phase may be recovered separately by decantation.

The liquid phase products from the steam stripper 22 comprise the aryl disulfides which therein have been freed of low boiling contaminants which are objectionable because of their odors. The liquid phase is recovered from the bottom of the steam stripper 22 through a valved conduit 27 for storage in an aryl disulfide storage vessel 28. If desired, the aryl disulfides may be recovered as product through a valved conduit 29 directly from the aryl disulfide storage vessel 28.

Referring back to the mixing and settling vessel 14: after the organic phase containing aryl disulfides is withdrawn, as described, through the valved conduit 18 and the valved conduit 19, only the aqueous acetic acid phase remains. This phase contains the inorganic contaminants which were removed during the washing treatment. The aqueous acetic acid phase is rejected from the system through valved conduit 18 and a valved conduit 30. This is accomplished by closing the valve in conduit 19 and opening the valve in conduit 30.

Thus the system illustrated in the drawing includes means for removing mechanical impurities, inorganic contaminants and low boiling, foul-smelling sulfur compounds and neutral oils from the aryl disulfides.

When the aryl disulfides are to be used as a rubber reclaiming oil, it is desirable to blend the aryl disulfides with a so-called cut back oil. This cut back oil is an extender for the aryl disulfides. High boiling naphthenic and paraffinic oils are satisfactory for this purpose. We have satisfactorily used a paraffinic oil having an initial boiling point of 350° C. for this purpose. A supply of cut back oil may be provided in a storage vessel 31. The cutback oil is introduced into a product mixing vessel 33 through a valved conduit 32. A supply of aryl disulfides is introduced into the product mixing vessel 33 through a valved conduit 34. From about 1 to 4 volumes of aryl disulfides are employed for each volume of cut back oil. While the aryl disulfides and cut back oil are miscible, some agitation means should be provided to assure uniform blending. Air may be introduced into the product mixing vessel 33 through an air conduit 35 for this purpose. Mechanical agitation may be employed if desired.

The blended product is withdrawn from the product mixing vessel 33 through a valved product withdrawal conduit 36.

To illustrate the present invention, a number of examples will be presented. In Examples 1–3, a sample of crude aryl disulfides was found to contain 0.13 percent inorganic material (including copper and manganese). These aryl disulfides were obtained from oxidation with manganese oxide catalyst of aryl hydrosulfides. The aryl disulfides, in turn, were obtained as a product from a petroleum refinery employing catalytic cracking processes and a copper sweetening process.

Example 1

The crude aryl disulfides were filtered through a laboratory filter. The filtrate contained 0.13 percent inorganic material. Hence no removal of inorganic contaminants resulted.

Example 2

The crude aryl disulfides were washed with hot water. The washed organic phase contained 0.13 percent inorganic material. Hence no removal of inorganic contaminants resulted.

Example 3

The crude aryl disulfides were washed with hot water and thereafter filtered through a laboratory filter. The filtered, washed organic phase contained 0.13 percent inorganic material. Hence no removal of inorganic contaminants resulted.

A sample of crude aryl disulfides was submitted for quantitative spectrographic analysis for copper and manganese. The sample also was submitted for semi-quantitative spectrographic analysis for other metals. The results were as follows:

A. Ash content _____ 0.096 percent

B. Quantitative spectrographic analysis:
    Ingredient in ash—     Quantity (percent of sample)
        Copper _____ 0.002
        Manganese _____ 0.007

C. Semi-quantitative spectrographic analysis:
    Ingredient in ash—
        10 to 100% _____ Iron, sodium.
        1 to 10% _____ Calcium.
        0.1 to 1.0% ____ Aluminum, chromium, lead, magnesium, silicon.
        0.01 to 0.1% ____ Copper, manganese, nickel, titanium, vanadium.
        Less than 0.01% . Molybdenum.

The described crude aryl disulfides were then treated as described in Examples 4 through 8.

Example 4

The crude aryl disulfides were washed with an equal volume of 5 percent hydrochloric acid. The washed organic phase contained 0.091 percent inorganic material. Hence only about 7 percent of the inorganic contaminants were eliminated. Some reversion of the aryl disulfides to thiophenols also occurred during the treatment.

Example 5

The crude aryl disulfides were washed with an equal volume of 37 percent hydrochloric acid. The washed organic phase contained 0.072 percent inorganic material. Here only about 26 percent of the inorganic contaminants were eliminated. Some reversion of the aryl disulfides to thiophenols also occurred during the treatment.

Example 6

A sample of crude aryl disulfide was washed with aqueous sulfuric acid. The mixture sludged severely. No attempt at product analysis was made.

Example 7

The crude aryl disulfides were washed with an equal volume of 5 percent solution of acetic acid. The washed aryl disulfides contained 0.037 percent inorganic material. Thus about 62 percent of the inorganic contaminants were eliminated. Analysis of the remaining inorganic material showed the copper content to be 0.00001 percent and the manganese content to be 0.00002 percent.

Thus the hydrochloric acid (Examples 4 and 5) effected only a slight reduction in the inorganic content of the aryl disulfides and also effected an undesirable destruction of some of the aryl disulfides. The acetic acid washing (Example 7), on the other hand, removed about 62 percent of the inorganic contaminants and reduced the copper and manganese contamination to an innocuous value. More than 99 percent of the copper was eliminated. About 96 percent of the manganese was removed.

The product of Example 7 was submitted for quantitative spectrographic analysis for copper, manganese, iron and ash. The product also was submitted for semi-quantitative spectrographic analysis for other metals. The results were as follows:

A. Ash content _____ 0.037 percent.
B. Quantitative spectrographic analysis:
   Ingredient in ash—   Quantity (percent of sample)
      Ash _____ 0.037
      Iron _____ 0.026
      Copper _____ 0.00001
      Manganese _____ 0.00002
C. Semi-quantitative spectrographic analysis:
   Ingredient in ash—
      From 1 to 10% _____ Tin.
      From 0.1 to 1% _____ Lead, nickel.
      From 0.01 to 0.1% __ Aluminum, calcium, chromium, magnesium, silicon, titanium.
      Less than 0.01% ____ Vanadium.
      Not found _____ Molybdenum, sodium.

Example 8

Crude aryl disulfides were washed with acetic acid as described in Example 7. The resulting liquid aryl disulfides contained 0.1078 percent of low boiling mercaptans. Live steam was passed through the liquid aryl disulfides and the stripped vapors were removed. About seven parts of steam were used for each part of aryl disulfides. The liquid aryl disulfides remaining showed only a trace of mercaptans or acetic acid. Mercaptan analysis in both instances was conducted by a technique employing ammonium thiocyanate and silver nitrate titration. Mercaptans were found in the condensed steam vapors.

The apparatus illustrated in the accompanying drawing has been described in relation to a batch-wise treating process. The system may be made semi-continuous by providing an additional mixing and settling vessel 14 and, if desired, an additional product mixing vessel 33. The additional vessel would be operated alternately according to the well-known semi-continuous principles.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method for removing metallic contaminants selected from the group consisting of copper, manganese, sodium, calcium, aluminum, chromium, magnesium and molybdenum from normally liquid aryl disulfides which comprises washing the aryl disulfides with an aqueous acetic acid solution immiscible therewith whereby the metallic contaminants are transferred to the aqueous acetic acid solution and recovering the aryl disulfides relatively free of metallic contaminants separately from the aqueous acetic acid solution containing dissolved metallic contaminants.

2. The method for removing copper contaminants from normally liquid aryl disulfides which comprises washing the aryl disulfides with an aqueous acetic acid solution immiscible therewith whereby the copper contaminants are transferred to the aqueous acetic acid solution and recovering the aryl disulfides relatively free of copper separately from the aqueous acetic acid solution containing dissolved copper contaminants.

3. The method for removing manganese contaminants from normally liquid aryl disulfides which comprises washing the aryl disulfides with an aqueous acetic acid solution immiscible therewith whereby the manganese contaminants are transferred to the aqueous acetic acid solution and recovering the aryl disulfides relatively free of manganese separately from the aqueous acetic acid solution containing dissolved manganese contaminants.

4. The method for purifying normally liquid aryl disulfides containing low boiling sulfur compounds and dissolved metallic contaminants selected from the group consisting of copper, manganese, sodium, calcium, aluminum, chromium, magnesium and molybdenum which comprises washing the aryl disulfides with an aqueous acetic acid solution immiscible therewith whereby the metallic contaminants are transferred to the aqueous acetic acid solution and recovering the aryl disulfides free of metallic contaminants separately from the aqueous acetic acid solution containing dissolved metallic contaminants, thereafter passing live steam through said liquid aryl disulfides in a vapor-liquid contacting zone to strip low boiling sulfur compounds and acetic acid therefrom, recovering effluent steam and vapors from said contacting zone and recovering liquid aryl disulfides substantially free of acetic acid and low boiling sulfur compounds therefrom.

5. The method for removing metallic contaminants selected from the group consisting of copper, manganese, sodium, calcium, aluminum, chromium, magnesium and molybdenum from normally liquid aryl disulfides which comprises washing the aryl disulfiides with 0.5 to 20 percent of its weight of an aqueous solution containing 1 to 20 percent of acetic acid whereby metallic contaminants are transferred to the aqueous solution and recovering the aryl disulfides relatively free of metallic contaminants separately from the aqueous solution containing dissolved metallic contaminants.

6. The method for removing copper contaminants from normally liquid aryl disulfides which comprises washing the aryl disulfides with 0.5 to 20 percent of its weight of an aqueous solution containing 1 to 20 percent of acetic acid whereby the copper contaminants are transferred to the aqueous solution and recovering the aryl disulfides relatively free of copper contaminants separately from the aqueous solution containing dissolved copper contaminants.

7. The method for removing manganese contaminants from normally liquid aryl disulfides which comprises washing the aryl disulfides with 0.5 to 20 percent of its weight of an aqueous solution containing 1 to 20 percent of acetic acid whereby the manganese contaminants are transferred to the aqueous solution and recovering the disulfides relatively free of manganese contaminants separately from the aqueous solution containing dissolved manganese contaminants.

8. The method for purifying normally liquid aryl disulfides containing low boiling sulfur compounds and metallic contaminants selected from the group consisting of copper, manganese, sodium, calcium, aluminum, chromium, magnesium and molybdenum which comprises washing the aryl disulfides with 0.5 to 20 percent of its weight of an aqueous solution containing 1 to 20 percent of acetic acid whereby the metallic contaminants are transferred to the aqueous solution and recovering the aryl disulfides relatively free of metallic contaminants separately from the aqueous solution containing dissolved metallic contaminants, thereafter passing 1 to 20 pounds of live steam through each pound of aryl disulfides in a vapor-liquid contacting zone to strip low boiling sulfur compounds and acetic acid therefrom, recovering effluent steam and vapors from said contacting zone and recovering liquid aryl disulfides substantially free of acetic acid and low boiling sulfur compounds therefrom.

References Cited in the file of this patent

UNITED STATES PATENTS 2,446,231   Johnson _____ Aug. 3, 1948